US010584881B2

(12) United States Patent
Murphy et al.

(10) Patent No.: US 10,584,881 B2
(45) Date of Patent: Mar. 10, 2020

(54) BROWNING CONTROL FOR AN OVEN (75) Inventors: Joshua B. Murphy, Columbus, OH (US); Jeffrey T. Debord, Worthington, OH (US); Eric A. Soller, Dayton, OH (US); Richard W. Cartwright, Piqua, OH (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 1426 days.

(21) Appl. No.: 13/274,671

(22) Filed: Oct. 17, 2011

(65) Prior Publication Data

US 2013/0092145 A1 Apr. 18, 2013

(51) Int. Cl.
*H05B 6/12* (2006.01)
*F24C 7/08* (2006.01)
(Continued)

(52) U.S. Cl.
CPC .............. *F24C 7/085* (2013.01); *A47J 36/321* (2018.08); *H05B 6/6473* (2013.01); *F24C 7/086* (2013.01)

(58) Field of Classification Search
CPC .......... F24C 7/086; F24C 7/082; F24C 7/085; H05B 1/0263; H05B 6/6435; H05B 6/647; H05B 6/687; Y02B 40/143
(Continued)

(56) References Cited

U.S. PATENT DOCUMENTS 4,415,790 A * 11/1983 Diesch ................. H05B 6/6482
219/492
6,262,406 B1 7/2001 Uehashi et al.
(Continued)

FOREIGN PATENT DOCUMENTS

CN 101415999 A 4/2009
CN 102132105 A 7/2011
(Continued)

OTHER PUBLICATIONS

International Search Report and Written Opinion of corresponding International Application No. PCT/US2012/059904 dated May 8, 2013.
(Continued)

*Primary Examiner* — Tu B Hoang
*Assistant Examiner* — Diallo I Duniver
(74) *Attorney, Agent, or Firm* — Burr & Forman, LLP (57) ABSTRACT

An oven includes a cooking chamber configured to receive a food product, a user interface configured to display information associated with processes employed for cooking, first and second energy sources, and a cooking controller. The first energy source provides primary heating and the second energy source provides secondary heating for the food product. The cooking controller may be operably coupled to the first and second energy sources. The cooking controller may include processing circuitry configured to enable an operator to make a browning control selection via the user interface by providing operator instructions to a selected control console rendered at the user interface. The selected control console may be selected based on a cooking mode of the oven. The browning control selection may provide control parameters to direct application of heat to the food product via the second energy source.

21 Claims, 10 Drawing Sheets

(51) Int. Cl.
*H05B 6/64* (2006.01)
*A47J 36/32* (2006.01)

(58) Field of Classification Search
USPC .......................................................... 99/342
See application file for complete search history.

(56) References Cited

U.S. PATENT DOCUMENTS

| | | | |
|---|---|---|---|
| 6,486,453 B1 * | 11/2002 | Bales et al. .................. | 219/702 |
| 6,750,433 B2 * | 6/2004 | Guenther et al. ............. | 219/506 |
| 6,753,510 B2 * | 6/2004 | Lile ..................... | A47J 37/0842 |
| | | | 219/398 |
| 6,936,801 B1 | 8/2005 | Head | |
| 7,461,588 B2 | 12/2008 | Head | |
| 2004/0007564 A1 | 1/2004 | Li | |
| 2008/0290087 A1 | 11/2008 | Ben-Shmuel et al. | |
| 2008/0295702 A1 * | 12/2008 | Wiedemann et al. .......... | 99/325 |
| 2009/0045191 A1 | 2/2009 | Ben-Shmuel et al. | |
| 2009/0057302 A1 | 3/2009 | Ben-Shmuel et al. | |
| 2009/0134151 A1 * | 5/2009 | Bogatin et al. ............... | 219/681 |
| 2009/0236333 A1 | 9/2009 | Ben-Shmuel et al. | |
| 2009/0236334 A1 | 9/2009 | Ben-Shmuel et al. | |
| 2009/0236335 A1 | 9/2009 | Ben-Shmuel et al. | |
| 2010/0006564 A1 | 1/2010 | Ben-Shmuel et al. | |
| 2010/0006565 A1 | 1/2010 | Ben-Shmuel et al. | |
| 2011/0017728 A1 | 1/2011 | Ben-Shmuel et al. | |
| 2011/0031236 A1 | 2/2011 | Ben-Shmuel et al. | |
| 2011/0031240 A1 | 2/2011 | Ben-Shmuel et al. | |
| 2011/0033584 A1 | 2/2011 | Bilchinsky et al. | |

FOREIGN PATENT DOCUMENTS

| | | |
|---|---|---|
| EP | 1504666 A1 | 2/2005 |
| EP | 2098788 A2 | 9/2009 |
| WO | 0170087 A2 | 9/2001 |
| WO | 2005067639 | 7/2005 |

OTHER PUBLICATIONS

Office Action of corresponding Chinese application No. 201280056422. X, dated Apr. 28, 2015, all enclosed pages cited.

* cited by examiner

BROWNING CONTROL FOR AN OVEN

TECHNICAL FIELD

Example embodiments generally relate to ovens and, more particularly, relate to an oven that is enabled to cook food with varying amounts of browning that can be controlled by a user.

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality.

In some cases, microwave cooking may be faster than convection or other types of cooking. Thus, microwave cooking may be employed to speed up the cooking process. However, a microwave typically cannot be used to cook some foods and cannot brown most foods. Given that browning may add certain desirable characteristics in relation to taste and appearance, it may be necessary to employ another cooking method in addition to microwave cooking in order to achieve browning. The application of heat for purposes of browning, however, may further the cooking process and begin to dry out or otherwise negatively impact the final product. For many combination ovens, striking a balance between browning and cooking can be a difficult manual process of trial and error.

BRIEF SUMMARY OF SOME EXAMPLES

Some example embodiments may provide an oven that employs multiple cooking sources that are electronically controlled via processing circuitry. The cooking sources may be balanced, under control of the processing circuitry, in consideration of the degree of browning that is desired, while taking into account the corresponding impact that such browning will have on the cooking process. The processing circuitry may further provide an operator with an intuitive control interface for selecting a degree of browning to be applied to a food product, and the heat added to achieve the degree of browning may be accounted for within the context of any other cooking sources employed during the cooking process in order to modify the times of application of respective ones of the other cooking sources.

In one example embodiment, an oven is provided. The oven may include a cooking chamber, a user interface, a first energy source, a second energy source and a cooking controller. The cooking chamber may be configured to receive a food product. The user interface may be configured to display information associated with processes employed for cooking the food product. The first energy source may provide primary heating of the food product placed in the cooking chamber. The second energy source may provide browning for the food product. The cooking controller may be operably coupled to the first and second energy sources. The cooking controller may include processing circuitry configured to enable an operator to make a browning control selection via the user interface by providing operator instructions to a selected control console rendered at the user interface. The selected control console may be selected based on a cooking mode of the oven. The browning control selection may provide control parameters to direct application of heat to the food product via the second energy source.

In another example embodiment, a cooking controller for use in an oven including a first energy source providing primary heating of a food product placed in the oven and a second energy source providing browning for the food product is provided. The cooking controller may be operably coupled to the first and second energy sources. The cooking controller may include processing circuitry configured to enable an operator to make a browning control selection via a user interface of the oven by providing operator instructions to a selected control console rendered at the user interface. The selected control console may be selected based on a cooking mode of the oven. The browning control selection may provide control parameters to direct application of heat to the food product via the second energy source.

Some example embodiments may improve the cooking performance and/or improve the operator experience when cooking with an oven employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Furthermore, as used herein the term "browning" should be understood to refer to the Maillard reaction or other desirable food coloration reactions whereby the food product is turned brown via enzymatic or non-enzymatic processes.

Some example embodiments may improve the cooking performance of an oven and/or may improve the operator experience of individuals employing an example embodiment. In this regard, since processing circuitry that controls the application of various heating sources can be used to provide operators with an intuitive interface to select a desired degree of browning, and since the processing circuitry can further account for the amount of browning selected while controlling the energy sources, a better cooked product may be achieved. Moreover, by controlling the energy source that applies browning and determining an impact for the amount of heat to be added to achieve the desired browning, and also controlling other energy sources in consideration of the impact the browning provides, a properly browned, but also well finished product may be provided. Excess drying or other negative impacts associated with heating browned foods may therefore be avoided.

Figure 1:
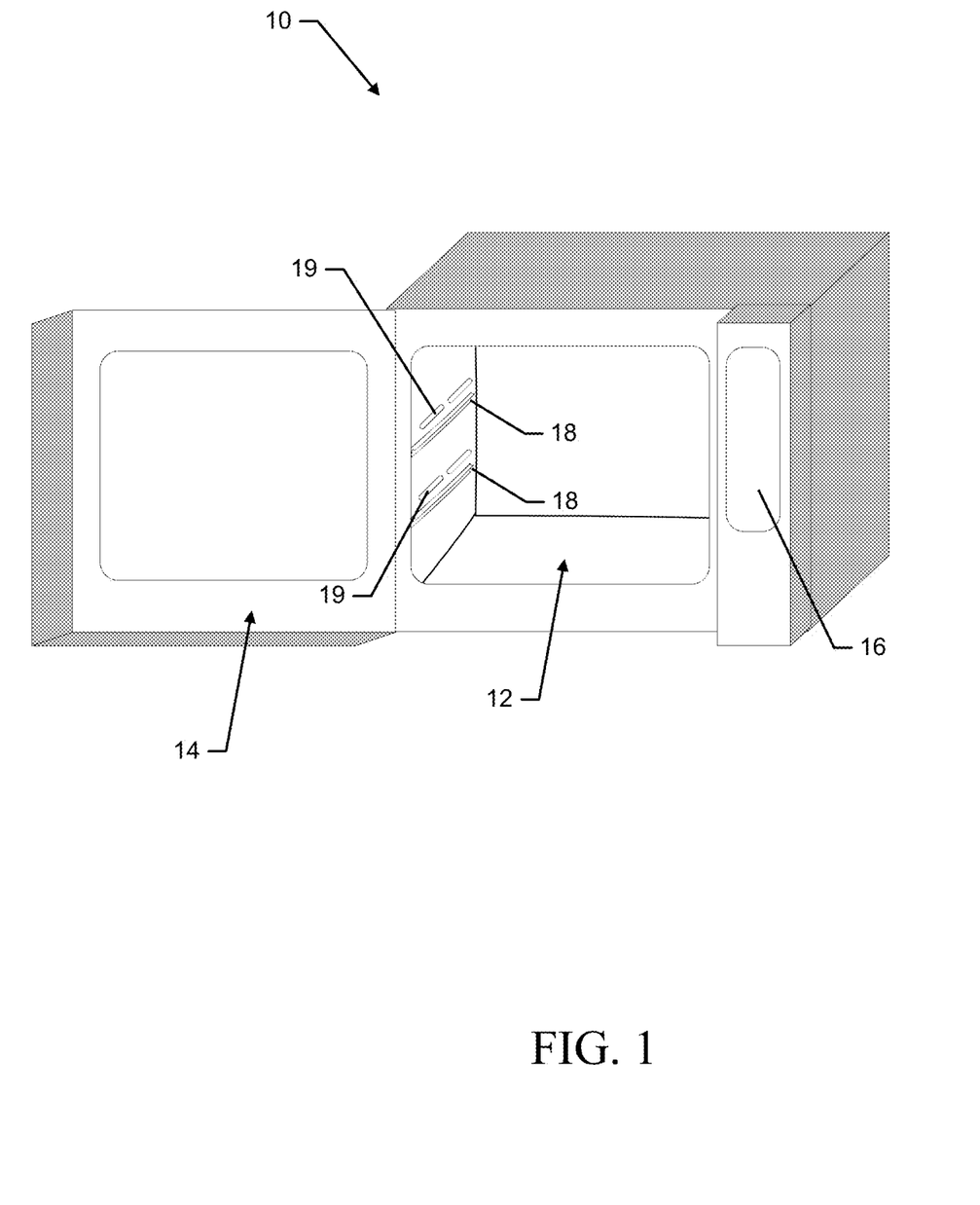
FIG. 1 illustrates a perspective view of an oven capable of employing at least two energy sources according to an example embodiment.

FIG. 1 illustrates a perspective view of an oven 10 according to an example embodiment. As shown in FIG. 1, the oven 10 may include a cooking chamber 12 into which a food product may be placed for the application of heat by any of at least two energy sources that may be employed by the oven 10. The cooking chamber 12 may include a door 14 and an interface panel 16, which may sit proximate to the door 14 when the door 14 is closed. In an example embodiment, the interface panel 16 may include a touch screen display capable of providing visual indications to an operator and further capable of receiving touch inputs from the operator. The interface panel 16 may be the mechanism by which instructions are provided to the operator, and the mechanism by which feedback is provided to the operator regarding cooking process status, options and/or the like.

In some embodiments, the oven 10 may include multiple racks or may include rack (or pan) supports 18 or guide slots in order to facilitate the insertion of one or more racks or pans holding food product that is to be cooked. In an example embodiment, airflow slots 19 may be positioned proximate to the rack supports 18 (e.g., above the rack supports in one embodiment) to enable air to be forced over a surface of food product placed in a pan or rack associated with the corresponding rack supports 18. Food product placed on any one of the racks (or simply on a base of the cooking chamber 12 in embodiments where multiple racks are not employed) may be heated at least partially using radio frequency (RF) energy. Meanwhile, the airflow that may be provided may be heated to enable browning to be accomplished as described in greater detail below.

Figure 2:
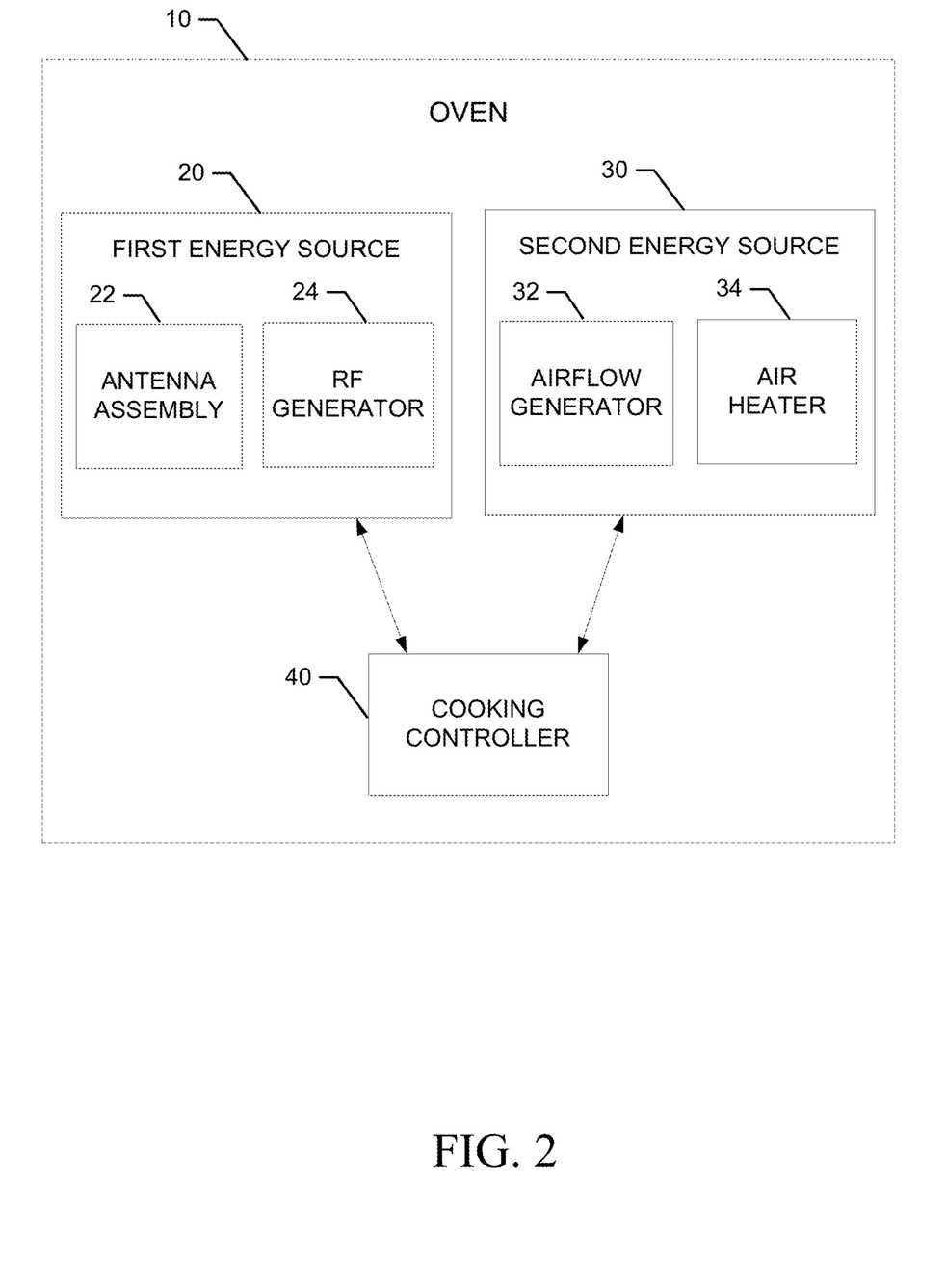
FIG. 2 illustrates a functional block diagram of the oven of FIG. 1 according to an example embodiment.

FIG. 2 illustrates a functional block diagram of the oven 10 according to an example embodiment. As shown in FIG. 2, the oven 10 may include at least a first energy source 20 and a second energy source 30. The first and second energy sources 20 and 30 may each correspond to respective different cooking methods. However, it should be appreciated that additional energy sources may also be provided in some embodiments.

In an example embodiment, the first energy source 20 may be a radio frequency (RF) energy source configured to generate relatively broad spectrum RF energy to cook food product placed in the cooking chamber 12 of the oven 10. Thus, for example, the first energy source 20 may include an antenna assembly 22 and an RF generator 24. The RF generator 24 of one example embodiment may be configured to generate RF energy at selected levels over a range of 800 MHz to 1 GHz. The antenna assembly 22 may be configured to transmit the RF energy into the cooking chamber 12 and receive feedback to indicate absorption levels of respective different frequencies in the food product. The absorption levels may then be used to control the generation of RF energy to provide balanced cooking of the food product.

In some example embodiments, the second energy source 30 may be a energy source capable of inducing browning of the food product. Thus, for example, the second energy source 30 may include an airflow generator 32 and an air heater 34. The airflow generator 32 may include a fan or other device capable of driving airflow through the cooking chamber 12 and over a surface of the food product (e.g., via the airflow slots). The air heater 34 may be an electrical heating element or other type of heater that heats air to be driven over the surface of the food product by the airflow generator 32. Both the temperature of the air and the speed of airflow will impact browning times that are achieved using the second energy source 30.

In an example embodiment, the first and second energy sources 20 and 30 may be controlled, either directly or indirectly, by a cooking controller 40. The cooking controller 40 may be configured to receive inputs descriptive of the food product and/or cooking conditions in order to provide instructions or controls to the first and second energy sources 20 and 30 to control the cooking process. In some embodiments, the cooking controller 40 may be configured to receive both static and dynamic inputs regarding the food product and/or cooking conditions. Dynamic inputs may include feedback data regarding absorption of RF spectrum, as described above. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), and/or the like.

In some embodiments, the cooking controller 40 may be configured to access data tables that define RF cooking parameters used to drive the RF generator 34 to generate RF energy at corresponding levels and/or frequencies for corresponding times determined by the data tables based on initial condition information descriptive of the food product. As such, the cooking controller 40 may be configured to employ RF cooking as a primary energy source for cooking the food product. However, other energy sources (e.g., secondary and tertiary or other energy sources) may also be employed in the cooking process. In some cases, programs or recipes may be provided to define the cooking parameters to be employed for each of multiple potential cooking stages that may be defined for the food product and the cooking controller 40 may be configured to access and/or execute the programs or recipes. In some embodiments, the cooking controller 40 may be configured to determine which program to execute based on inputs provided by the user. In an example embodiment, an input to the cooking controller 40 may also include browning instructions. In this regard, for example, the browning instructions may include instructions regarding the air speed, air temperature and/or time of application of a set air speed and temperature combination. The browning instructions may be provided via a user interface as described in greater detail below.

Figure 3:
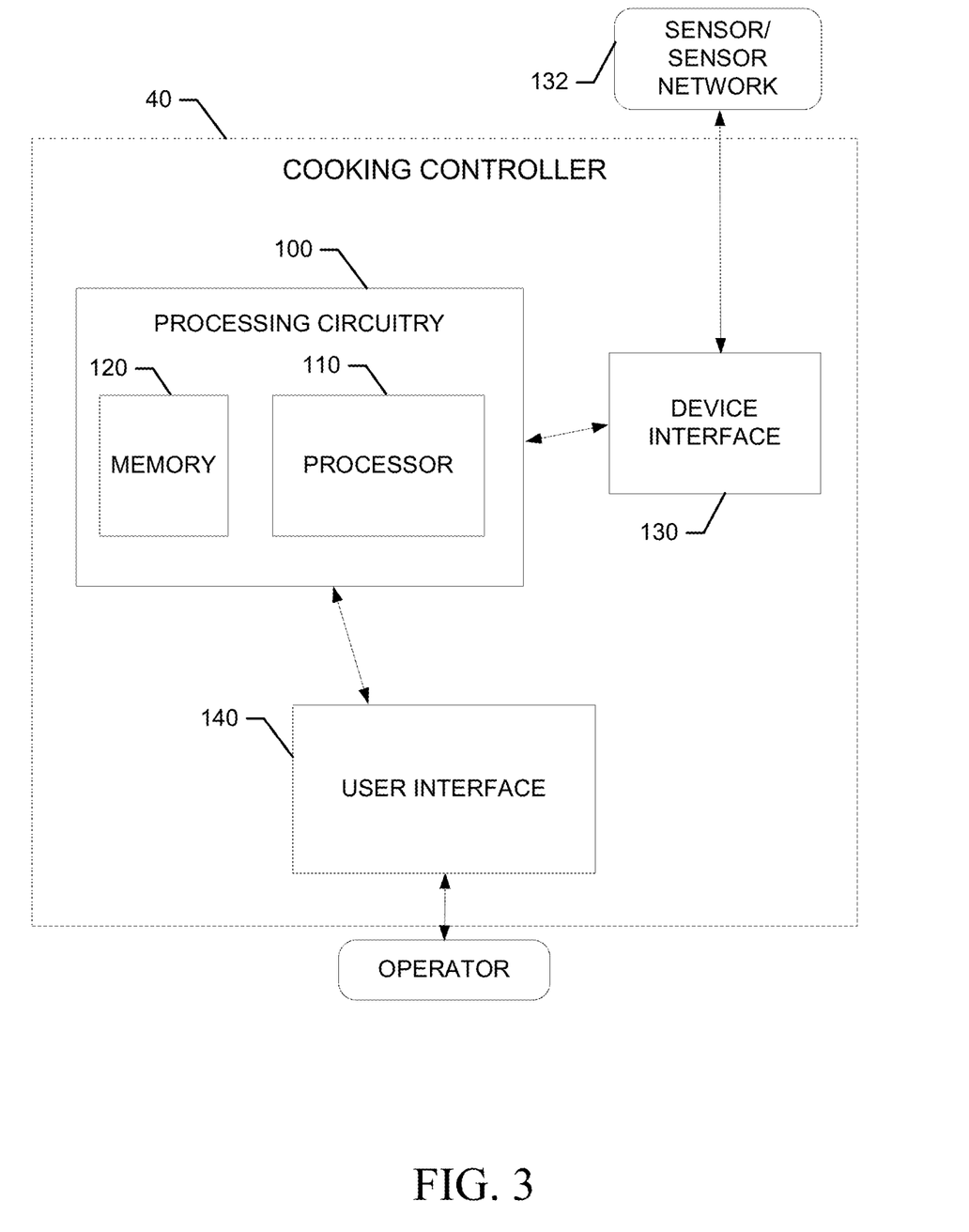
FIG. 3 illustrates a block diagram of a cooking controller according to an example embodiment.

FIG. 3 illustrates a block diagram of the cooking controller 40 according to an example embodiment. In some embodiments, the cooking controller 40 may include or otherwise be in communication with processing circuitry 100 that is configurable to perform actions in accordance with example embodiments described herein. As such, for example, the functions attributable to the cooking controller 40 may be carried out by the processing circuitry 100.

The processing circuitry 100 may be configured to perform data processing, control function execution and/or other processing and management services according to an example embodiment of the present invention. In some embodiments, the processing circuitry 100 may be embodied as a chip or chip set. In other words, the processing circuitry 100 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 100 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 100 may include a processor 110 and memory 120 that may be in communication with or otherwise control a device interface 130 and, a user interface 140. As such, the processing circuitry 100 may be embodied as a circuit chip (e.g., an integrated circuit chip) configured (e.g., with hardware, software or a combination of hardware and software) to perform operations described herein. However, in some embodiments, the processing circuitry 100 may be embodied as a portion of an on-board computer.

The user interface 140 (which may be embodied as, include, or be a portion of the interface panel 16) may be in communication with the processing circuitry 100 to receive an indication of a user input at the user interface 140 and/or to provide an audible, visual, mechanical or other output to the user (or operator). As such, the user interface 140 may include, for example, a display (e.g., a touch screen), one or more hard or soft buttons or keys, and/or other input/output mechanisms. In some embodiments, the user interface 140 may be provided on a front panel (e.g., positioned proximate to the door 14), on a portion of the oven 10.

The device interface 130 may include one or more interface mechanisms for enabling communication with other devices such as, for example, sensors of a sensor network (e.g., sensor/sensor network 132) of the oven 10, removable memory devices, wireless or wired network communication devices, and/or the like. In some cases, the device interface 130 may be any means such as a device or circuitry embodied in either hardware, or a combination of hardware and software that is configured to receive and/or transmit data from/to sensors that measure any of a plurality of device parameters such as frequency, temperature (e.g., in the cooking chamber 12 or in air passages associated with the second energy source 30), air speed, and/or the like. As such, in one example, the device interface 130 may receive input at least from a temperature sensor that measures the air temperature of air heated (e.g., by air heater 34) prior to introduction of such air (e.g., by the airflow generator 32) into the cooking chamber 12. Alternatively or additionally, the device interface 130 may provide interface mechanisms for any devices capable of wired or wireless communication with the processing circuitry 100.

In an exemplary embodiment, the memory 120 may include one or more non-transitory memory devices such as, for example, volatile and/or non-volatile memory that may be either fixed or removable. The memory 120 may be configured to store information, data, applications, instructions or the like for enabling the cooking controller 40 to carry out various functions in accordance with exemplary embodiments of the present invention. For example, the memory 120 could be configured to buffer input data for processing by the processor 110. Additionally or alternatively, the memory 120 could be configured to store instructions for execution by the processor 110. As yet another alternative, the memory 120 may include one or more databases that may store a variety of data sets responsive to input from the sensor network, or responsive to programming of any of various cooking programs. Among the contents of the memory 120, applications may be stored for execution by the processor 110 in order to carry out the functionality associated with each respective application. In some cases, the applications may include control applications that utilize parametric data to control the application of heat by the first and second energy sources 20 and 30 as described herein. In this regard, for example, the applications may include operational guidelines defining expected browning speeds for given initial parameters (e.g., food type, size, initial state, location, and/or the like) using corresponding tables of temperatures and air speeds. Thus, some applications that may be executable by the processor 110 and stored in memory 120 may include tables plotting air speed and temperature to determine browning times for certain levels of browning (e.g., light, medium, heavy or any other level delineations that may be provided to describe a spectrum of possible browning characteristics that may be achieved).

The processor 110 may be embodied in a number of different ways. For example, the processor 110 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 110 may be configured to execute instructions stored in the memory 120 or otherwise accessible to the processor 110. As such, whether configured by hardware or by a combination of hardware and software, the processor 110 may represent an entity (e.g., physically embodied in circuitry—in the form of processing circuitry 100) capable of performing operations according to embodiments of the present invention while configured accordingly. Thus, for example, when the processor 110 is embodied as an ASIC, FPGA or the like, the processor 110 may be specifically configured hardware for conducting the operations described herein. Alternatively, as another example, when the processor 110 is embodied as an executor of software instructions, the instructions may specifically configure the processor 110 to perform the operations described herein.

In an example embodiment, the processor 110 (or the processing circuitry 100) may be embodied as, include or otherwise control the cooking controller 40. As such, in some embodiments, the processor 110 (or the processing circuitry 100) may be said to cause each of the operations described in connection with the cooking controller 40 by directing the cooking controller 40 to undertake the corresponding functionalities responsive to execution of instructions or algorithms configuring the processor 110 (or processing circuitry 100) accordingly. As an example, the cooking controller 40 may be configured to control air speed, temperature and/or the time of application of heat based on browning characteristics input at the user interface 140. In some examples, the cooking controller 40 may be configured to make adjustments to temperature and/or air speed based on the browning time selected. Alternatively, the cooking controller 40 may be enabled to make adjustments to browning time based on the adjustment of either or both of the temperature and air speed.

Furthermore, in some example embodiments, the cooking controller 40 may be configured to determine a cooking impact that heat addition associated with browning may provide to an already calculated cook time associated with another energy source (e.g., the first energy source 20). Thus, for example, if a cook time is determined for cooking relative to heating applied by the first energy source 20, and adjustments or inputs are made to direct usage of the second energy source 30 for browning, the cooking controller 40 may be configured to calculate adjustments (and apply such adjustments) to the cooking time of the first energy source 20 in order to ensure that the browning operation does not overcook or overheat the food product.

Figure 4:
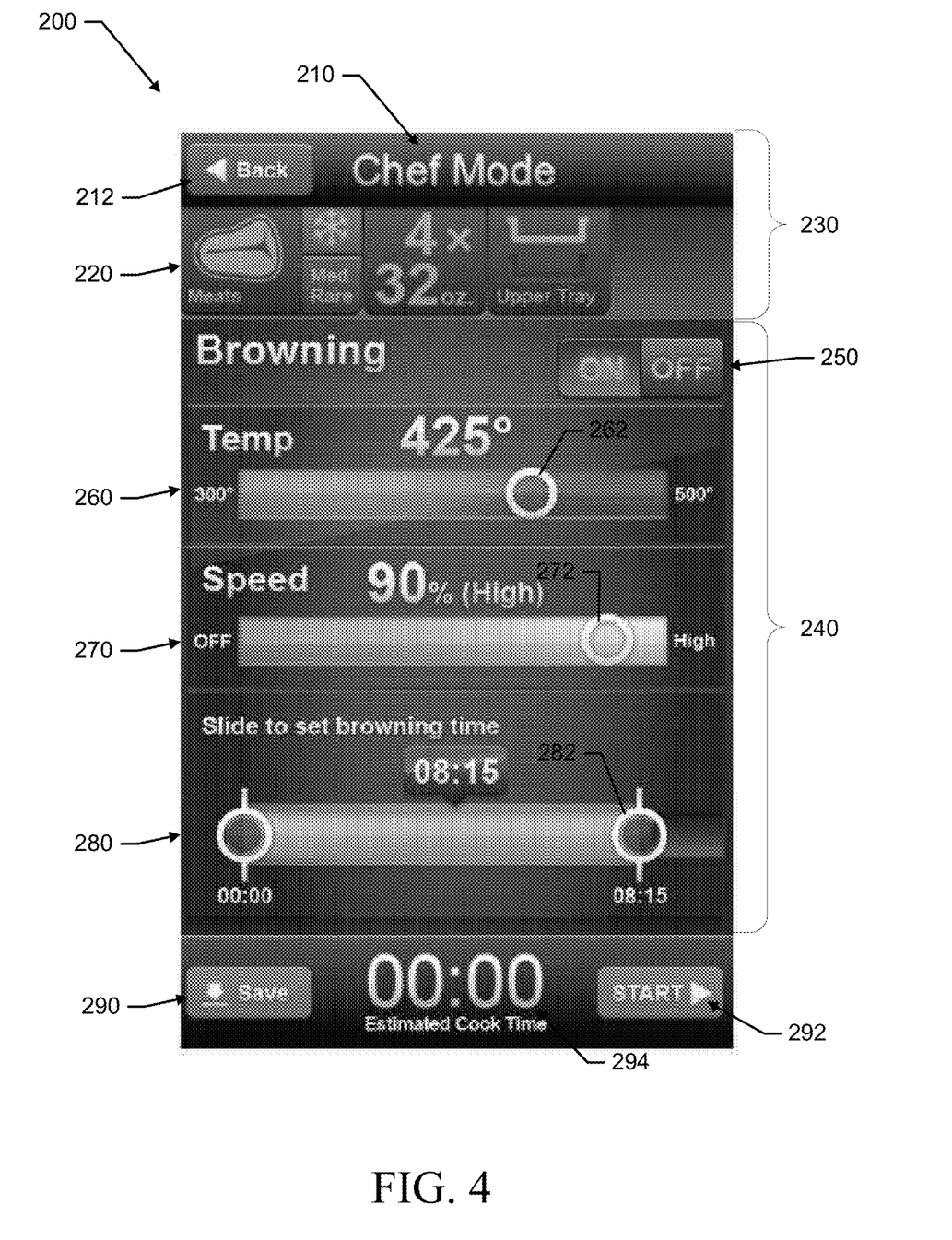
FIG. 4 illustrates a screen shot of a control console according to an example embodiment.

In an example embodiment, the cooking controller 40 may also provide (e.g., via the user interface 140) the user with an intuitive interface for controlling browning operations of the oven 10. FIG. 4 illustrates an example of a user interface that may be employed by the cooking controller 40 according to an example embodiment. As shown in FIG. 4, the user interface 140 may present (e.g., responsive to direction by the processing circuitry 100) a control console 200. Control console 200 may be one screen among a plurality of different control screens that may be provided via the user interface 140 by the cooking controller 40 to facilitate provision of instructions by the user to the oven 10 and/or to facilitate provision of feedback, options, or data to the user. In an example embodiment, the processing circuitry 100 may be configured to determine which of a plurality of different control console screens to present to the user based on an operating mode of the oven. As such, for example, multiple different operating modes may exist (e.g., based on operator experience level and/or an operators desired level of interaction/control) and each operating mode may have a corresponding different selectable control console screen for browning control associated therewith.

The control console 200 may indicate a current operating mode 210 and provide navigation options (e.g., back button 212). In some embodiments, the control console 200 may also provide an indication of initial conditions via a selection indicator 220. The selection indicator 220 may list or otherwise identify the initial conditions that may have been entered by the operator or that may be default conditions or previously existing conditions (e.g., from the last entered data). The current operating mode 210 and the selection indicator 220 may be provided at a mode related portion 230 of the control console 200. In this regard, the mode related portion 230 of the control console 200 may provide information that is specific to the current mode (e.g., chef mode in this example), but is not specific to a current control operation. As such, the control console 200 may also include a current control operation portion 240 that may provide indications or options that are specific to the control operation that is enabled to be manipulated via the current screen displayed on the control console 200.

In an example embodiment, the control console 200 may include a browning control operation. FIG. 4 specifically indicates one example of a current control operation portion 240 for manipulation of browning control. It should be noted that although some example embodiments of the control console 200 include at least one display portion that is generic to the current mode of operation (e.g., the mode related portion 230) and another display portion that is specific to the current control operation within that mode of operation (e.g., the current control operation portion 240), some embodiments may display only the current control operation portion 240 without any generic mode related information.

Browning control may be turned on or off via control selector 250. When browning control is turned off, either no browning may be applied at all (e.g., via operation of the cooking controller 40 to use only the first energy source 20, or at least not use the second energy source 30) or any browning control may be conducted via default settings. In an example embodiment, browning control selectors may be provided for parameters including temperature, air speed and browning time. In some embodiments, the browning control selectors may each be provided with slider bars or other selectable elements that may be selectively positioned by the operator within the corresponding spectrum of available options defined by the range covered by each respective browning control selector. As shown in FIG. 4, a temperature selector 260 may include a range of temperature values displayed over a scale (e.g., 300 F to 500 F) and a slider bar 262 that may be slid over any portion of the scale to select the air temperature for the second heating source 30 (e.g., for air heater 34). An air speed selector 270 may also be provided to include a range of air speeds (e.g., from off to maximum or high speed, or 0% to 100%) that may be selected using slider bar 272 to control airflow (e.g., via airflow generator 32). A time selector 280 may also be provided to enable the user to use slider bar 282 to select an amount of time for the application of heated airflow for browning. Although not necessary, the browning control selectors may be color coded along their respective ranges to further illustrate the values represented. In embodiments, the selected browning time may be displayed proximate to the slider bar 282 and/or the time selector 280. Selections that are made may be saved to a particular program using save button 290, and execution of the settings provided may be initiated using the start button 292. A total estimated cook time 294 for the current program may also be provided.

Figure 5:
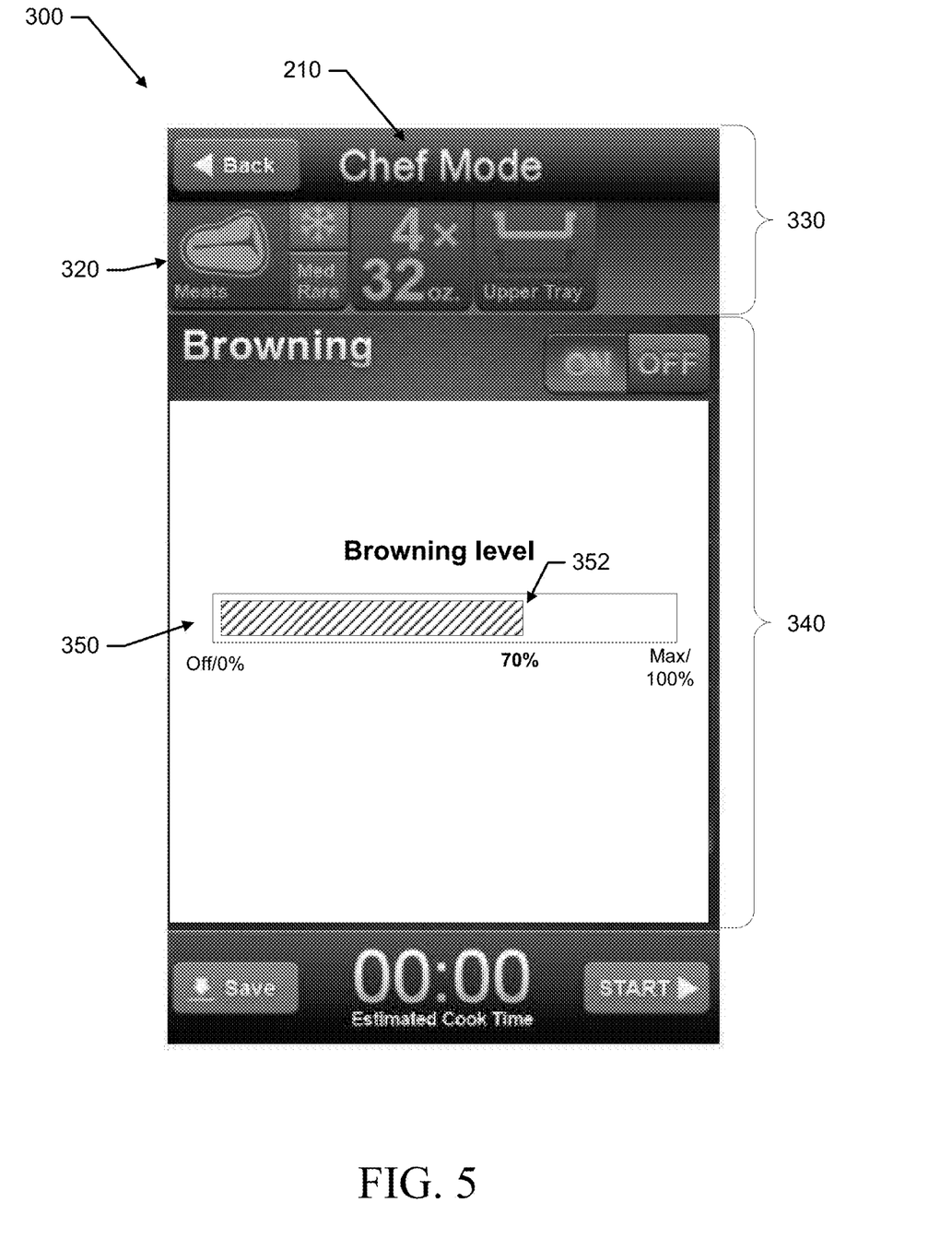
FIG. 5 illustrates a screen shot of an alternative control console according to an example embodiment.

FIG. 5 illustrates a simplified example of a control console for controlling browning according to an example embodiment. As shown in FIG. 5, the control console 300 may include a mode related portion 330 indicating a current operating mode 310 and the selection indicator 320. However, in this example, the current control operation portion 340 may be simplified relative to the example of FIG. 4. In this regard, a single browning controller 350 may be provided with a slidable selector 352 that selects browning over a range from none to maximum (or 0% to 100%). Dependent upon the position of the slidable selector 352, the cooking controller 40.

In the example of FIG. 4, the cooking controller 40 may apply the selected temperature and air speed, as indicated by slider bars 262 and 272, for the selected time, as indicated by slider bar 282. This may give the user very detailed control over browning parameters to be employed. However, in the example of FIG. 5, a more simple operational mode (e.g., a guided or automatic mode) may be provided in which the user may simply provide an indication of a degree of browning that is desired and the cooking controller 40 may determine the temperature, air speed and time control parameters for delivery of the corresponding amount of browning. In this regard, the cooking controller 40 may access data tables that indicate, for the initial conditions entered, the amount of time to apply a certain temperature and/or air speed to achieve a specific level of browning. The cooking controller 40 may then select the corresponding parameters via control of the second energy source 30.

In some embodiments, a combination of the above two examples may be provided. In such an example, the cooking controller 40 may display selected temperature and air speed settings (and/or a time value) based on a selected browning level. However, the user may be enabled to adjust the time, temperature or air speed to control one or more of those parameters. The cooking controller 40 may then adjust other parameters in order to achieve the selected browning level given the specific value selected by the user. For example, if the user selects a medium level of browning, the cooking controller 40 may select an air speed, time and temperature (based on table values for the initial conditions entered) and present the selected parameters to the user. If the user wants to shorten the time, the temperature and/or air speed may be increased by the cooking controller 40 in order to shorten the browning time. If the user wants to lower the temperature, the cooking controller 40 may increase the time and/or air speed in order to allow for the selected level of browning to be achieved with the lower temperature selected. Meanwhile, if the user wants to use a lower air speed (e.g., for a delicate item), the cooking controller 40 may increase the temperature and/or time to achieve the desired level of browning with the selected lower air speed.

In some embodiments, the cooking controller 40 may also adjust cooking parameters associated with the first energy source 20 based on adjustments made to the browning control. Thus, for example, as browning levels are increased, the additional heat to which the food product will be subjected may be accounted for by the cooking controller 40 so that the cooking controller 40 may reduce levels or the time of application of the first energy source 20. Accordingly, the cooking controller 40 may provide a robust control mechanism by which the quality of food product cooked by the oven 10 may be preserved. In this regard, for example, the cooking controller 40 may provide for a robust control capability for the operator with respect to browning of food product in a combination oven that employs RF energy and another energy source for browning.

When initially programmed cooking is complete, the operator may remove the cooked food product and secure cooking operations. However, in some instances, the operator may wish to take additional actions relative to the food product. For example, the operator may wish to save an executed program for duplication of the cooking program in the future. Alternatively, the operator may wish to add further cook time using either or both of the first and second energy sources 20 and 30. FIGS. 6-9 illustrate some example screens that may be encountered to assist the operator in finishing a product after initially executed programming has been completed.

Figure 6:
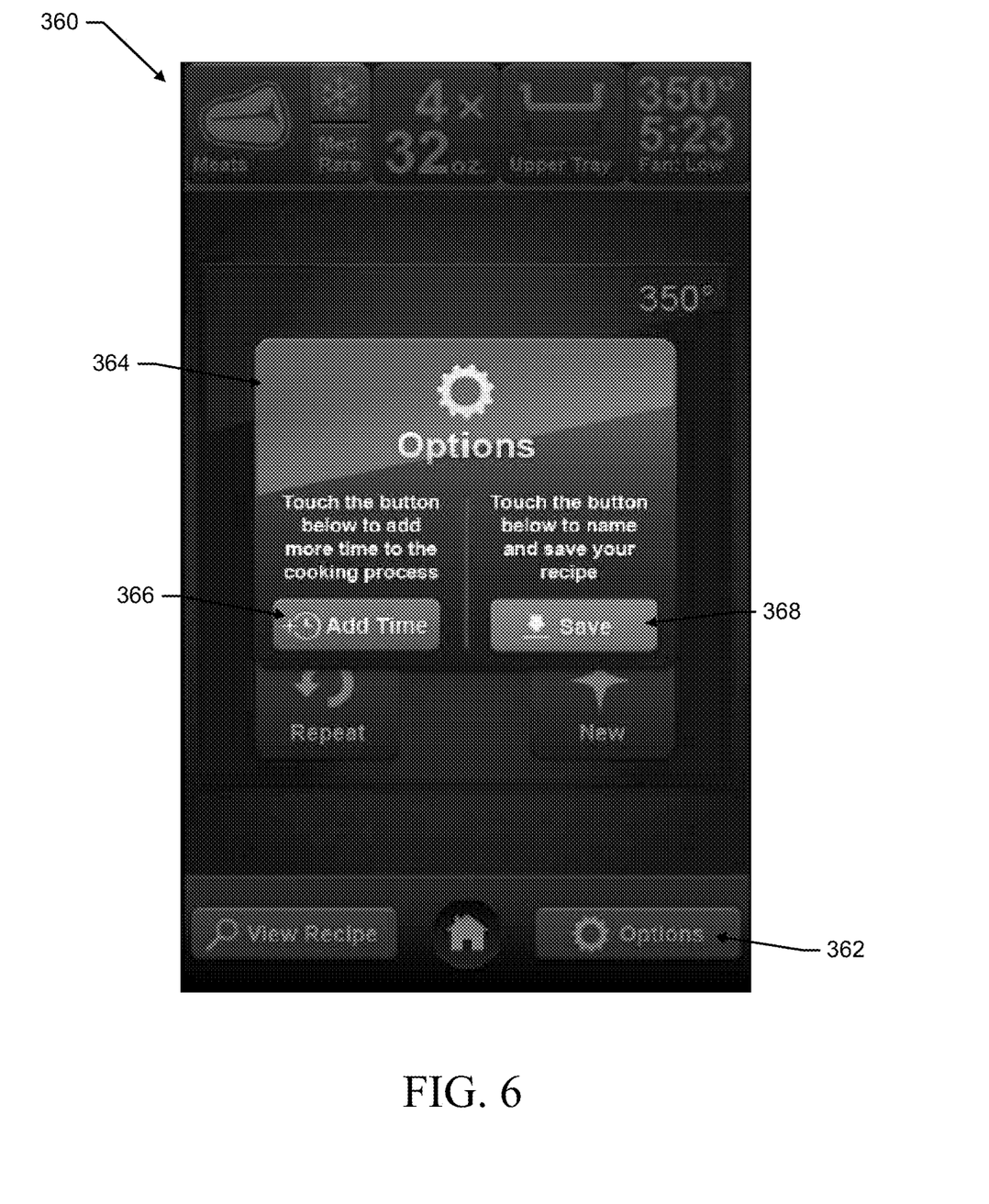
FIG. 6 illustrates one example of a control console presentable during a finishing sequence for selecting an option to add browning time according to an example embodiment.

In this regard, FIG. 6 illustrates one example of a control console presentable during a finishing sequence for selecting an option to add browning time according to an example embodiment. In this regard, for example, a finishing option page 360 may be presented with at least one option for finishing the cooking sequence. For example, options may be presented to select a new cooking program, to repeat the program just completed, to view the recipe, to stop the cooking process, or to see further options (e.g., via options button 362). In an example embodiment, selection of the options button 362 may result in presentation of a control console 364 that enables the user to add more time to the cooking process by selecting an add time button 366 and/or to save the program just completed as a recipe by selecting a save button 368.

Figure 7:
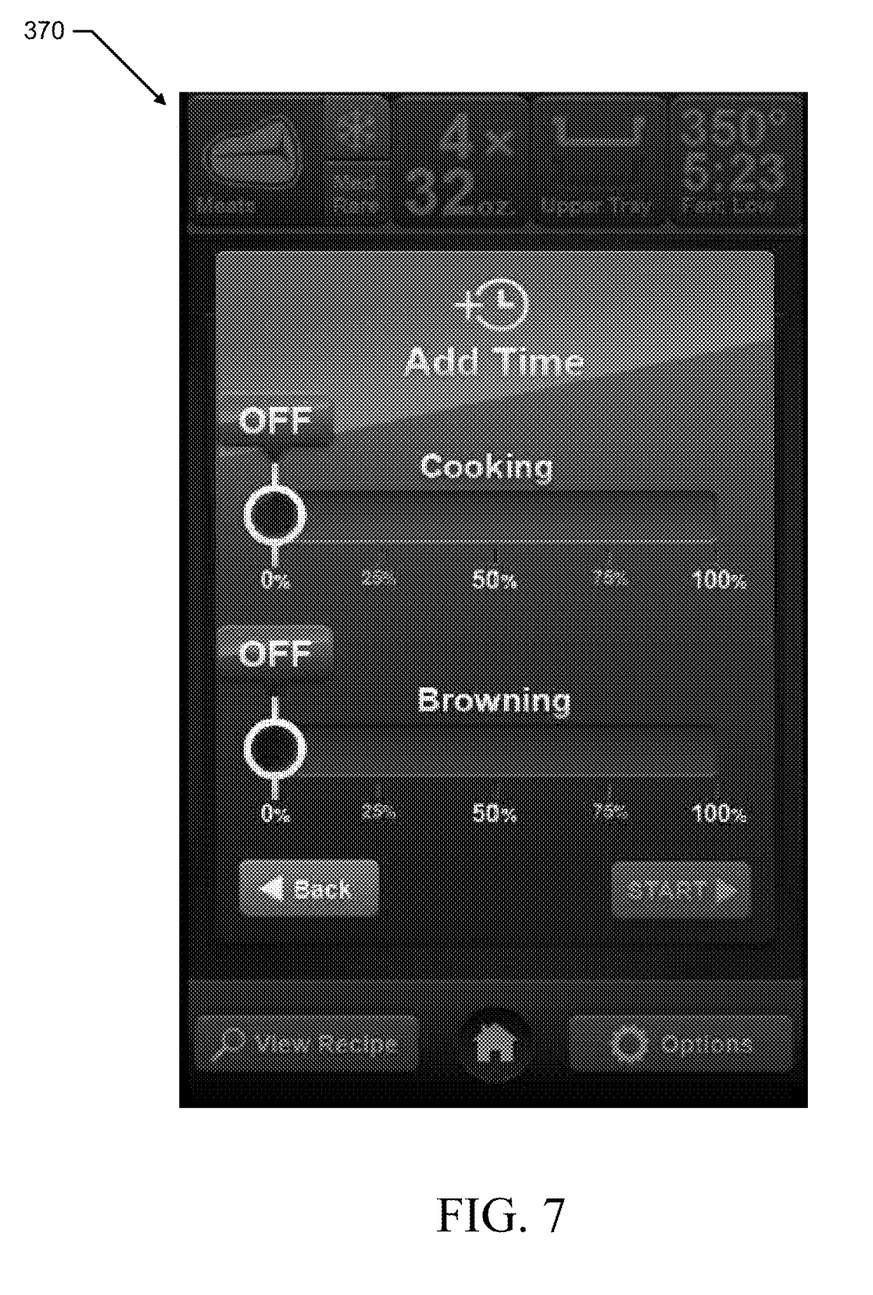
FIG. 7 illustrates an example of a control console for enabling selection of additional browning time according to an example embodiment.
Figure 8:
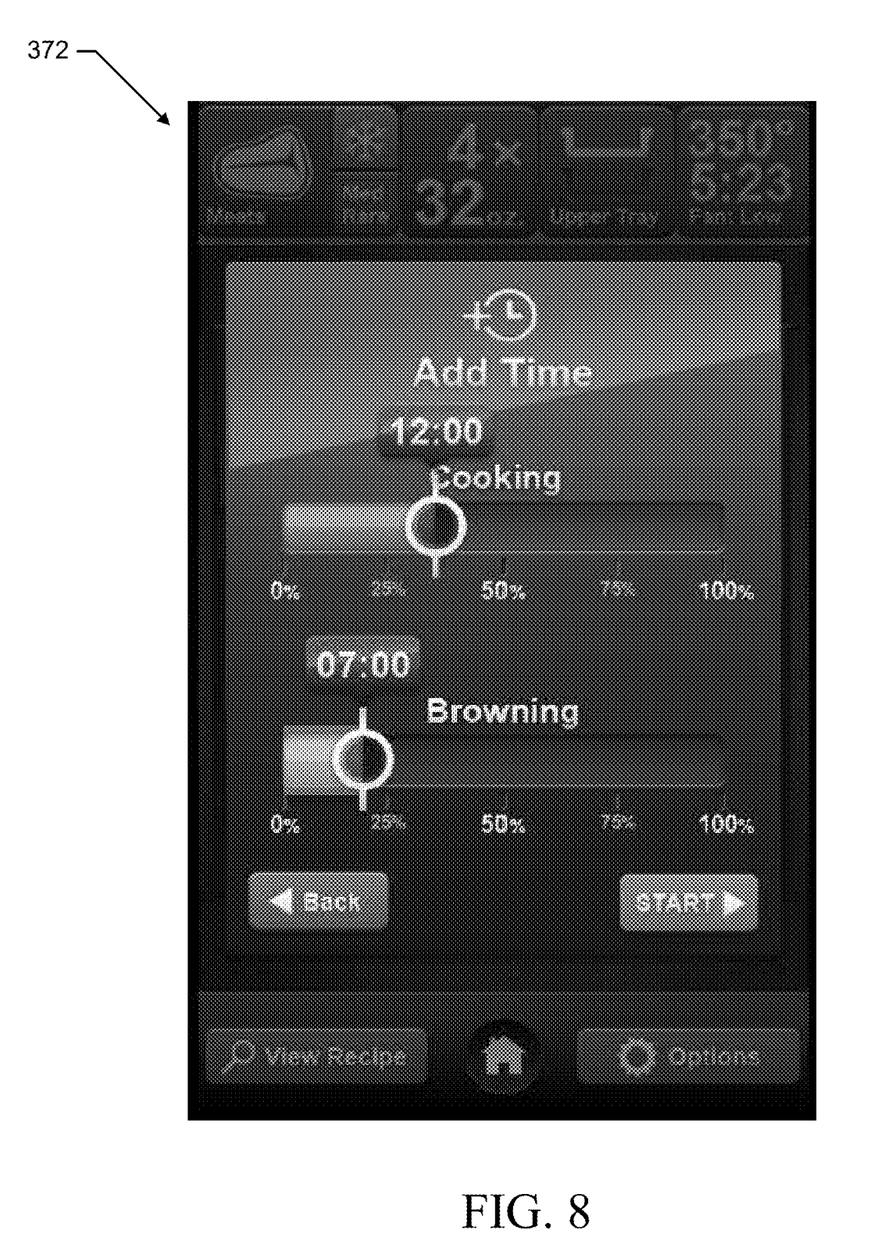
FIG. 8 illustrates the addition of further browning time according to an example embodiment.
Figure 9:
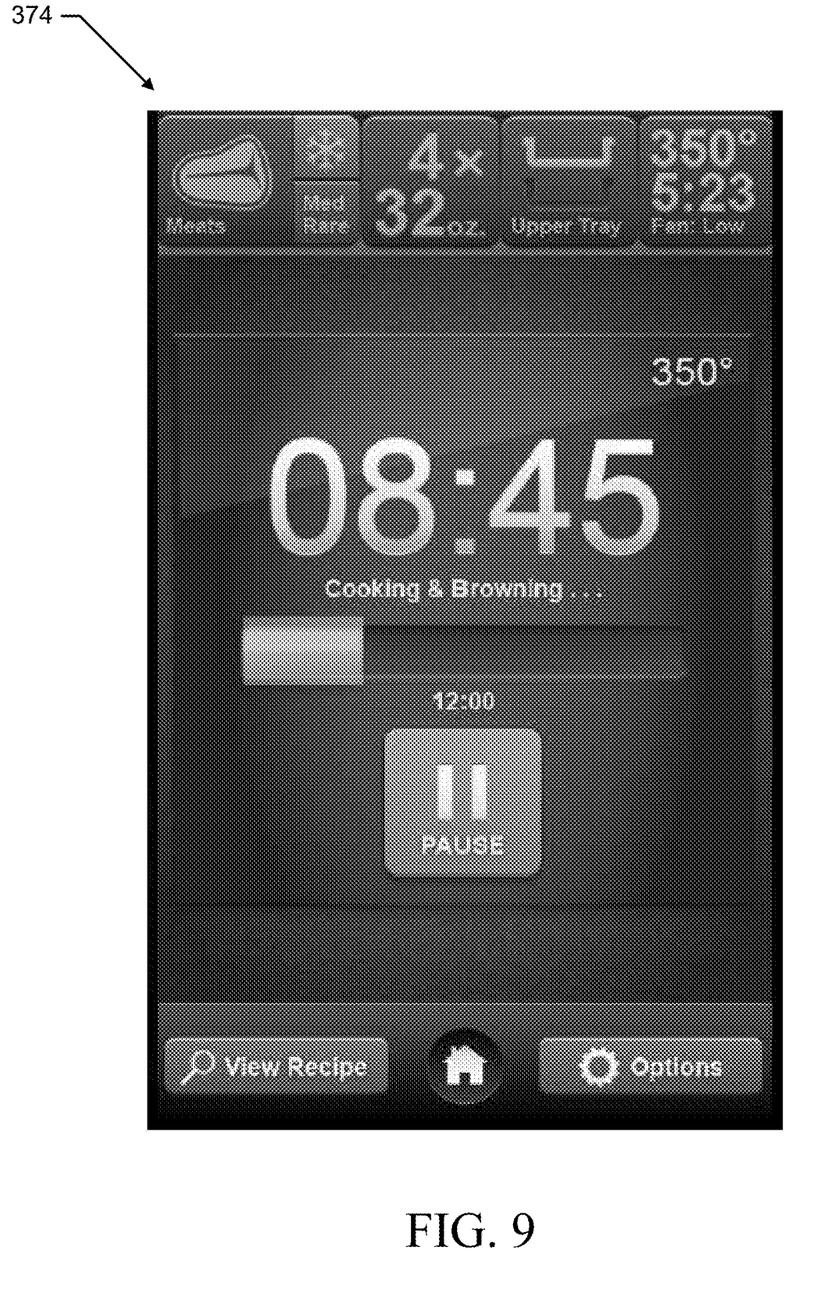
FIG. 9 illustrates an activity summary screen illustrating additional cooking and browning time added to a program or recipe executed according to an example embodiment.

In an example embodiment, selection of the add time button 366 may launch a control console FIG. 7 illustrates an example of a time addition control console 370 for enabling selection of additional browning time and/or cooking time according to an example embodiment. As shown in FIG. 7, the operator may select to turn on additional cooking and/or browning. Then, as is shown in the enabled control console 372 of FIG. 8, each cooking selector that is enabled may be individually operated to increase the corresponding time for application of the corresponding energy source. In some cases, the operator may slide a controller to increase cooking time and browning time independently of one another. As the operator slides each respective controller, the additional time selected for the application of the corresponding energy source may be presented. In some cases, the additional time may be selected as a percentage of the initial time selected for application of the corresponding energy source. The operator may then select a start button to initiate the addition of energy based on the selections made in the enabled control console 372. FIG. 9 illustrates an activity summary screen 374 illustrating additional cooking and browning time added to a program or recipe executed according to an example embodiment. As such, according to some embodiments, the cooking controller 40 may be employed to provide the user with a graphical user interface via which browning can be controlled relative to a primary cooking process such as RF cooking. In this regard, for example, in some cases, the cooking controller 40 may further control when the browning is instituted relative to the primary cooking process (e.g., with browning related heating being initiated at a selected time proximate to the end of the primary cooking process). Thus, in the example of FIG. 9, additional cooking time may be immediately commenced with primary energy being added (e.g., from the first energy source 20), but commencement of the addition of energy for additional browning time (e.g., via the second energy source 30) may be delayed to overlap with a selected portion of the additional cooking time. In other words, in some cases, the cooking controller 40 may be configured to provide a control console to enable the operator to define when to apply energy via the second energy source 30 relative to application of energy via the first energy source 20.

Figure 10:
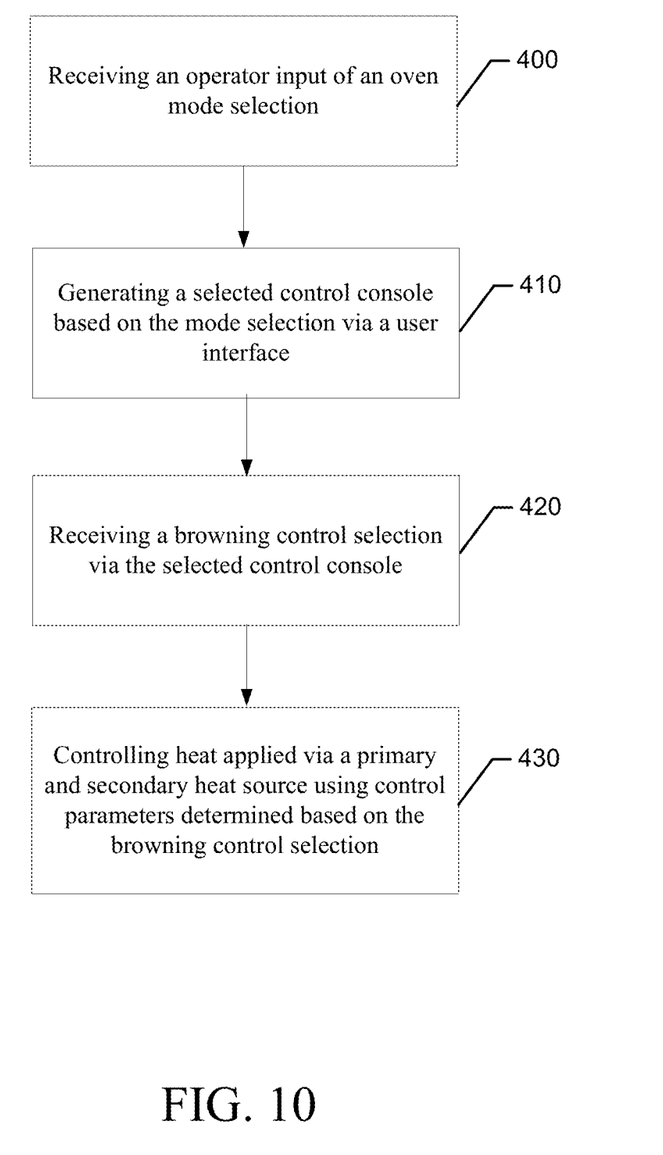
FIG. 10 illustrates a method according to an example embodiment.

FIG. 10 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., oven 10) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 10, may include receiving an operator input of an oven mode selection at optional operation 400. A user interface may be utilized to generate a selected control console based on the mode selection at operation 410. The method may further include receiving a browning control selection via the selected control console at operation 420. The method may further include controlling heat applied via a primary energy source (e.g., the first energy source 20) and secondary energy source (e.g., the second energy source 30) using control parameters determined based on the browning control selection at operation 430.

In an example embodiment, an apparatus for performing the method of FIG. 10 above may comprise a processor (e.g., the processor 110) configured to perform some or each of the operations (400-430) described above. The processor may, for example, be configured to perform the operations (400-430) by performing hardware implemented logical functions, executing stored instructions, or executing algorithms for performing each of the operations.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
a cooking chamber configured to receive a food product;
a user interface configured to display information associated with processes employed for cooking the food product;
a first energy source providing primary heating of the food product placed in the cooking chamber;
a second energy source providing browning for the food product; and
a cooking controller operably coupled to the first and second energy sources, the cooking controller including processing circuitry configured to enable an operator to make a browning control selection via the user interface by providing operator instructions to a selected control console rendered at the user interface,
wherein the selected control console is one of a plurality of different control console screens presented to the operator via the user interface that is selected based on a selected cooking mode of the oven,
wherein the browning control selection provides control parameters to direct application of heat to the food product via the second energy source for browning the food product,
wherein information associated with the selected cooking mode is displayed on one portion of the selected control console and information associated with enabling selection of the control parameters for browning in the selected cooking mode is displayed on another portion of the selected control console,
wherein information associated with enabling selection of the control parameters for browning in the selected cooking mode comprises a variable range selector to enable selection of a temperature, speed, or time, and
wherein in response to an adjustment to the variable range selector, the cooking controller calculates and applies a corresponding adjustment to the first energy source to ensure the second energy source does not overcook or overheat the food product.

2. The oven of claim 1, wherein the selected cooking mode is one of a first mode in which the operator is enabled to select multiple ones of the control parameters including air temperature, air speed and time associated with browning the food product, and a second mode in which the operator is enabled to select a browning level and the control parameters are automatically determined based on the browning level selected.

3. The oven of claim 2, wherein the second mode further enables the operator to select an adjustment to at least one of the control parameters and at least another one of the control parameters is automatically adjusted to provide the browning level selected based on the adjustment.

4. The oven of claim 1, wherein the processing circuitry is configured to determine the control parameters based at least in part on initial condition information entered by the operator, the initial condition information including a food type, initial food product state, desired final food product state, number of portions, size of portions, or location.

5. The oven of claim 1, wherein the selected cooking mode is a mode in which the operator is enabled to select one or more of air temperature, air speed and time for application of the corresponding air temperature and speed using selectors that correspond to each respective one of a defined air temperature range, a defined air speed range, and a time scale.

6. The oven of claim 1, wherein the control parameters include one or more of air temperature, air speed and time for applying heated air to the food product, and wherein the processing circuitry is configured to determine an adjustment for at least one of the control parameters, in response to adjustment of another one of the control parameters, when still another of the control parameters is maintained constant.

7. The oven of claim 1, wherein the control parameters include one or more of a browning level, air temperature, air speed and time for applying heated air to the food product, and wherein the processing circuitry is configured to determine an adjustment for at least one of the air temperature, the air speed and the time, in response to adjustment of another one of the air temperature, the air speed and the time, when the browning level is maintained constant.

8. The oven of claim 1, wherein the control parameters include a browning level and wherein the processing circuitry is configured to access data tables to determine a corresponding air speed, air temperature and browning time for the selected browning level based on initial conditions entered by the operator.

9. The oven of claim 1, wherein the browning control selection is entered via a touch screen display.

10. A cooking controller for use in an oven, the oven including
a first energy source providing primary heating of a food product placed in the oven and
a second energy source providing browning for the food product, the cooking controller operably coupled to the first and second energy sources and comprising processing circuitry configured to enable an operator to make a browning control selection via a user interface of the oven by providing operator instructions to a selected control console rendered at the user interface,
wherein the selected control console is one of a plurality of different control console screens presented to the operator via the user interface that is selected based on a selected cooking mode of the oven, and
wherein the browning control selection provides control parameters to direct application of heat to the food product via the second energy source for browning the food product,
wherein information associated with the selected cooking mode is displayed on one portion of the selected control console and information associated with enabling selection of the control parameters for browning in the selected cooking mode is displayed on another portion of the selected control console,
wherein information associated with enabling selection of the control parameters for browning in the selected cooking mode comprises a variable range selector to enable selection of a temperature, speed, or time, and
wherein in response to an adjustment to the variable range selector, the cooking controller calculates and applies a corresponding adjustment to the first energy source to ensure the second energy source does not overcook or overheat the food product.

11. The cooking controller of claim 10, wherein the selected cooking mode is one of a first mode in which the operator is enabled to select multiple ones of the control parameters including air temperature, air speed and time associated with browning the food product, and a second mode in which the operator is enabled to select a browning level and the control parameters are automatically determined based on the browning level selected.

12. The cooking controller of claim 11, wherein the second mode further enables the operator to select an adjustment to at least one of the control parameters and at least another one of the control parameters is automatically adjusted to provide the browning level selected based on the adjustment.

13. The cooking controller of claim 10, wherein the processing circuitry is configured to determine the control parameters based at least in part on initial condition information entered by the operator, the initial condition information including a food type, initial food product state, desired final food product state, number of portions, size of portions, or location.

14. The cooking controller of claim 10, wherein the selected cooking mode is a mode in which the operator is enabled to select one or more of air temperature, air speed and time for application of the corresponding air temperature and speed using selectors that correspond to each respective one of a defined air temperature range, a defined air speed range, and a time scale.

15. The cooking controller of claim 10, wherein the control parameters include one or more of air temperature, air speed and time for applying heated air to the food product, and wherein the processing circuitry is configured to determine an adjustment for at least one of the control parameters, in response to adjustment of another one of the control parameters, when still another of the control parameters is maintained constant.

16. The cooking controller of claim 10, wherein the control parameters include one or more of a browning level, air temperature, air speed and time for applying heated air to the food product, and wherein the processing circuitry is configured to determine an adjustment for at least one of the air temperature, the air speed and the time, in response to adjustment of another one of the air temperature, the air speed and the time, when the browning level is maintained constant.

17. The cooking controller of claim 10, wherein the control parameters include a browning level and wherein the processing circuitry is configured to access data tables to determine a corresponding air speed, air temperature and browning time for the selected browning level based on initial conditions entered by the operator.

18. The cooking controller of claim 10, wherein the selected control console enables the operator to define when to apply energy via the second energy source relative to application of energy via the first energy source.

19. The oven of claim 1, wherein the information associated with the selected cooking mode comprises a plurality of icons displayed on the other portion of the selected control console, each of the icons providing an indication of a previous selection entry of a corresponding plurality of selections made in association with cooking via the selected cooking mode.

20. The cooking controller of claim 10, wherein the information associated with the selected cooking mode comprises a plurality of icons displayed on the other portion of the selected control console, each of the icons providing an indication of a previous selection entry of a corresponding plurality of selections made in association with cooking via the selected cooking mode.

21. The oven of claim 1, wherein the variable range selector comprises a slider bar.

* * * * *